United States Patent [19]

Yoshida et al.

[11] Patent Number: 5,664,805
[45] Date of Patent: Sep. 9, 1997

[54] AIR BAG

[75] Inventors: Ryoichi Yoshida; Noriyuki Kosugi, both of Shiga; Eiji Yanagi, Kanagawa; Yoshihiko Tanaka, Shiga; Akira Kokeguchi, Shiga; Tadayuki Atoh, Shiga; Yoshihiko Minami, Shiga, all of Japan

[73] Assignee: Takata Corporation, Tokyo, Japan

[21] Appl. No.: 469,610

[22] Filed: Jun. 6, 1995

Related U.S. Application Data

[63] Continuation-in-part of Ser. No. 322,515, Oct. 14, 1994, abandoned.

[30] Foreign Application Priority Data

Nov. 5, 1993 [JP] Japan ................................. 5-276811
Jun. 10, 1994 [JP] Japan ................................. 6-128974

[51] Int. Cl.⁶ .......................................................... B60R 21/16
[52] U.S. Cl. .............................................................. 280/743.1
[58] Field of Search ................................ 280/743.1, 728.1

[56] References Cited

U.S. PATENT DOCUMENTS

| | | | |
|---|---|---|---|
| 5,022,675 | 6/1991 | Zelenak, Jr. et al. | 280/743.1 |
| 5,226,671 | 7/1993 | Hill | 280/743.1 |
| 5,310,216 | 5/1994 | Wehner et al. | 280/743.1 |
| 5,316,337 | 5/1994 | Yamaji et al. | 280/743.1 |

FOREIGN PATENT DOCUMENTS 2 237 538  5/1991  United Kingdom.

Primary Examiner—Paul N. Dickson
Attorney, Agent, or Firm—Kanesaka & Takeuchi

[57] ABSTRACT

An air bag is structured by superposing a lower panel and an upper panel and sewing up the peripheral portions of the panels. The air bag is provided with an opening for an inflator at its rear portion. Flaps are extended from a peripheral portion of the opening for the inflator.

3 Claims, 9 Drawing Sheets

AIR BAG

CROSS-REFERENCE TO RELATED APPLICATION

This is a continuation-in-part application of patent application Ser. No. 08/322,515 filed on Oct. 14, 1994, now abandoned.

FIELD OF THE INVENTION AND RELATED ART STATEMENT

The present invention relates to an air bag of an air bag device for protecting an occupant in a passenger seat or a rear seat when a vehicle comes into collision.

Figure 13:
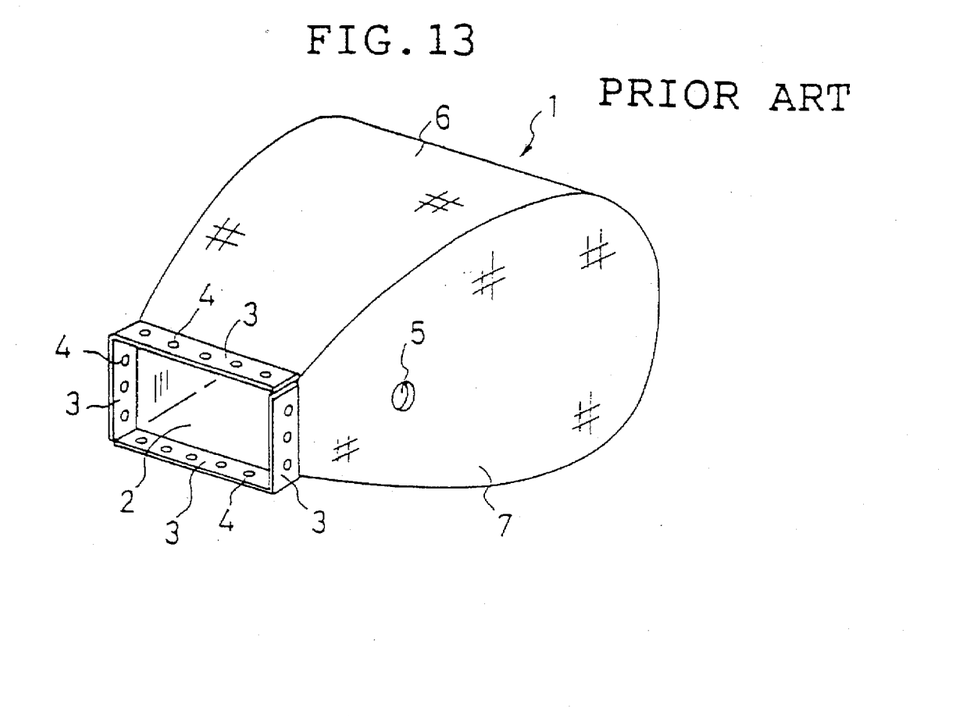
FIG. 13 is a perspective view of a conventional air bag for a passenger seat.

A conventional air bag for a passenger seat will be described with reference to FIG. 13.

The air bag 1 for a passenger seat has an opening 2 for introducing gas from an inflator (not shown) which is disposed at the rear portion of the air bag 1. The air bag 1 is made of cloth and provided with flaps 3 which are made by impregnating synthetic resin or piling up and sewing reinforcing cloths on the periphery of the opening 2. The flaps 3 are provided with a plurality of through holes for inserting bolts in or rivets for connecting the air bag 1 to a container (not shown) of the air bag device.

Figure 14:
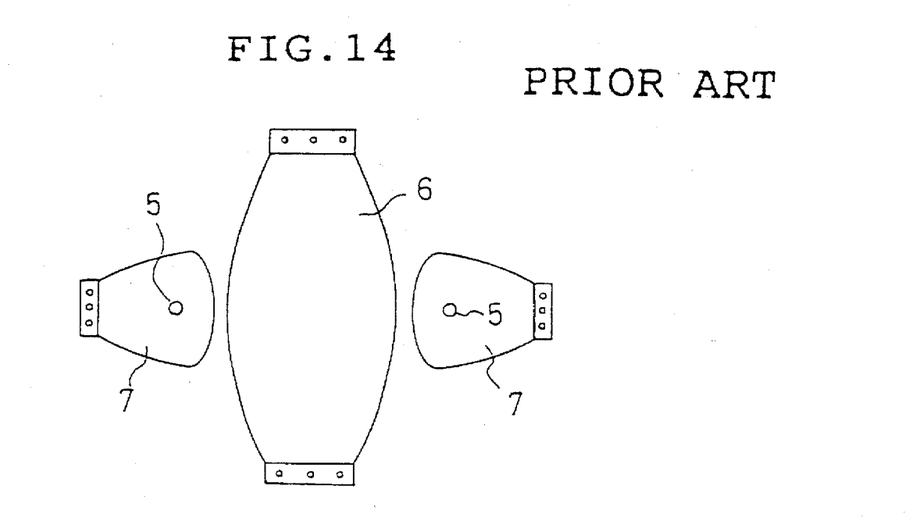
FIG. 14 is an exploded view showing the structure of the conventional air bag for a passenger seat.

The air bag 1 is made by sewing the peripheries of a side panels 7 on the periphery of a long center panel 6 as shown in FIG. 14.

The side panels 7 are each provided with vent hole 5 previously. When the occupant plunges into the air bag 1, the vent holes 5 allow gas to flow out to absorb an impact applied to the occupant.

If the conventional air bag for a passenger seat as mentioned above, it takes many hours to sew the side panels 7 on the center panel 6 of a predetermined size because of a three-dimensional sewing.

That is, when each of the side panels 7 is sewed on the center panel 6, the peripheries of them are superposed each other and sewed by a sewing machine. For superposing the peripheries, it is necessary to curve the center panel 6 along the periphery of the side panel 7. Therefore, it is difficult to superpose the edge portion of the center panel 6 on each of the peripheries of the side panel 7. Because the center panel 6 and the side panels 7 are sewed up along curves of center panel 6, it is difficult and needs a lot of time and labor to sew them up.

After one of the side panels is sewed on the center panel the other side panel has been sewed on the center panel. In this case, it is particularly difficult to sew them up because the one side panel sewed up is bulky and is an obstacle to sew the other side panel.

OBJECT AND SUMMARY OF THE INVENTION

It is therefore an object of the present invention to provide an air bag wherein the air bag be made easily and production cost can be remarkably reduced.

An air bag according to the present invention is used for an air bag device for a passenger seat or a rear seat and wherein the air bag is made by superposing two panels and connecting the peripheral portions of the panels. The air bag is provided with an opening for introducing gas from an inflator at the rear end thereof, and the panels are integrally provided with flaps surrounding the opening to fix the air bag to a container of the air bag device.

Preferably, the container has a rectangular front opening, and the air bag has a first flap extended from the lower panel to dispose along one side edge of the front opening of the container, and second, third, and fourth flaps extended from the upper panel to dispose along the other three side edges of the front opening of the container.

Since the air bag of the present invention is made by superposing panels such as two sheets of cloth and connecting the peripheries of them by sewing or the like, the air bag is produced easily.

The flaps are extended from the lower panel and the upper panel, so that the air bag can be fixed to a container using the flaps.

DETAILED DESCRIPTION OF THE PREFERRED EMBODIMENT

Figure 7:
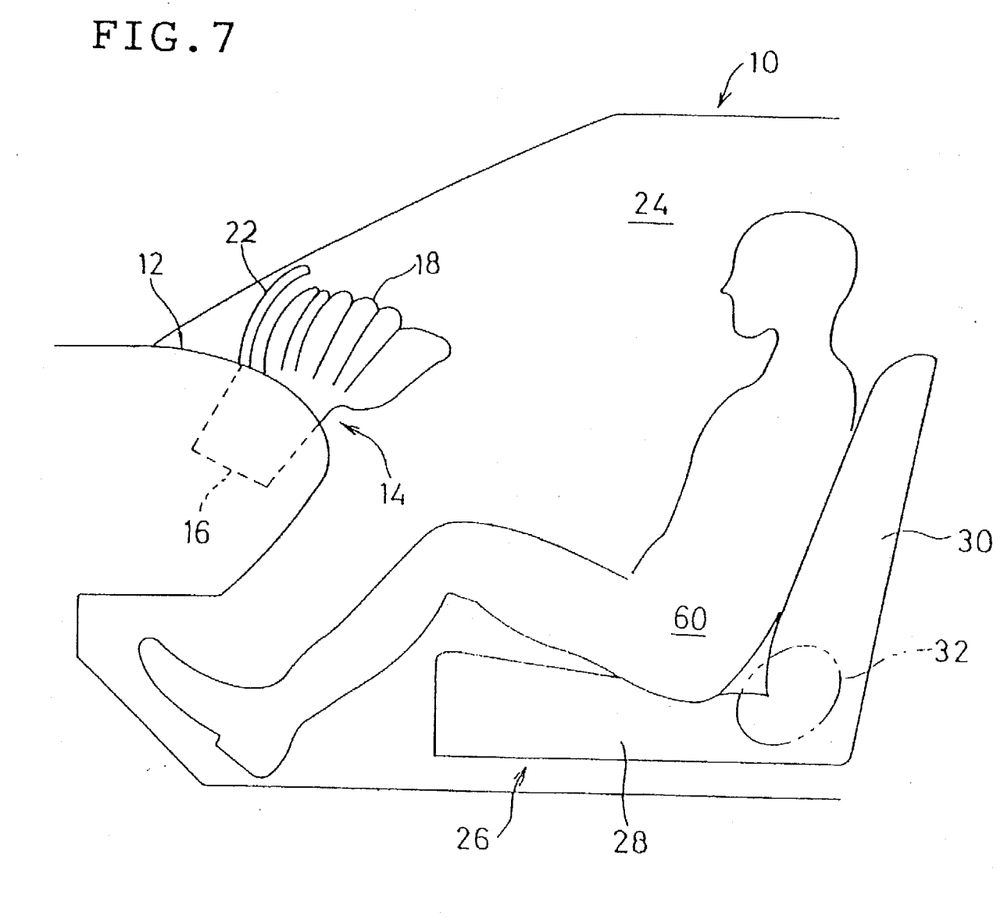
FIG. 7 is a side view of the inside of a vehicle mounted with an air bag device according to the embodiment.
Figure 8:
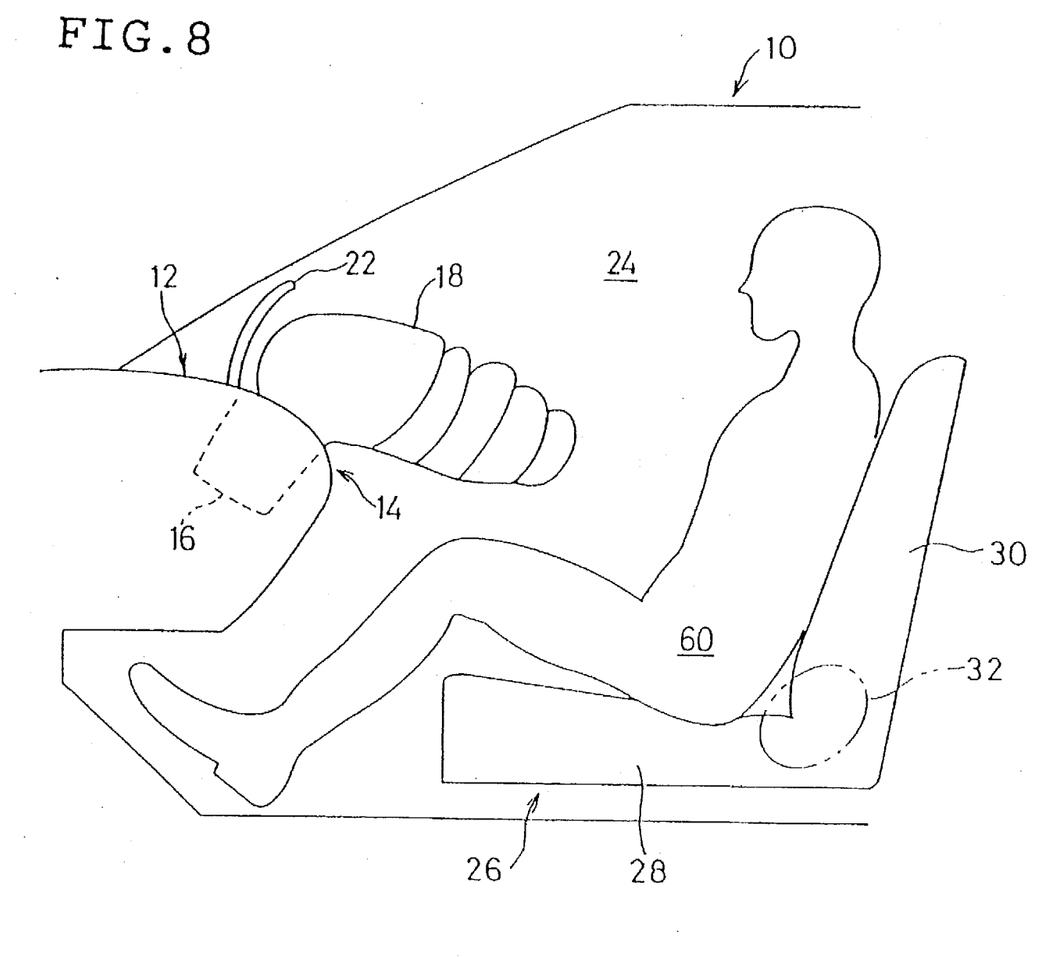
FIG. 8 is a side view of the inside of the vehicle mounted with the air bag device according to the embodiment.

Embodiments will now be described with reference to the attached drawings. FIGS. 1–6 are explanatory views of an air bag according to an embodiment of the present invention and FIGS. 7–9 are inside views showing the inside of a vehicle mounted with an air bag device according to the embodiment.

Figure 9:
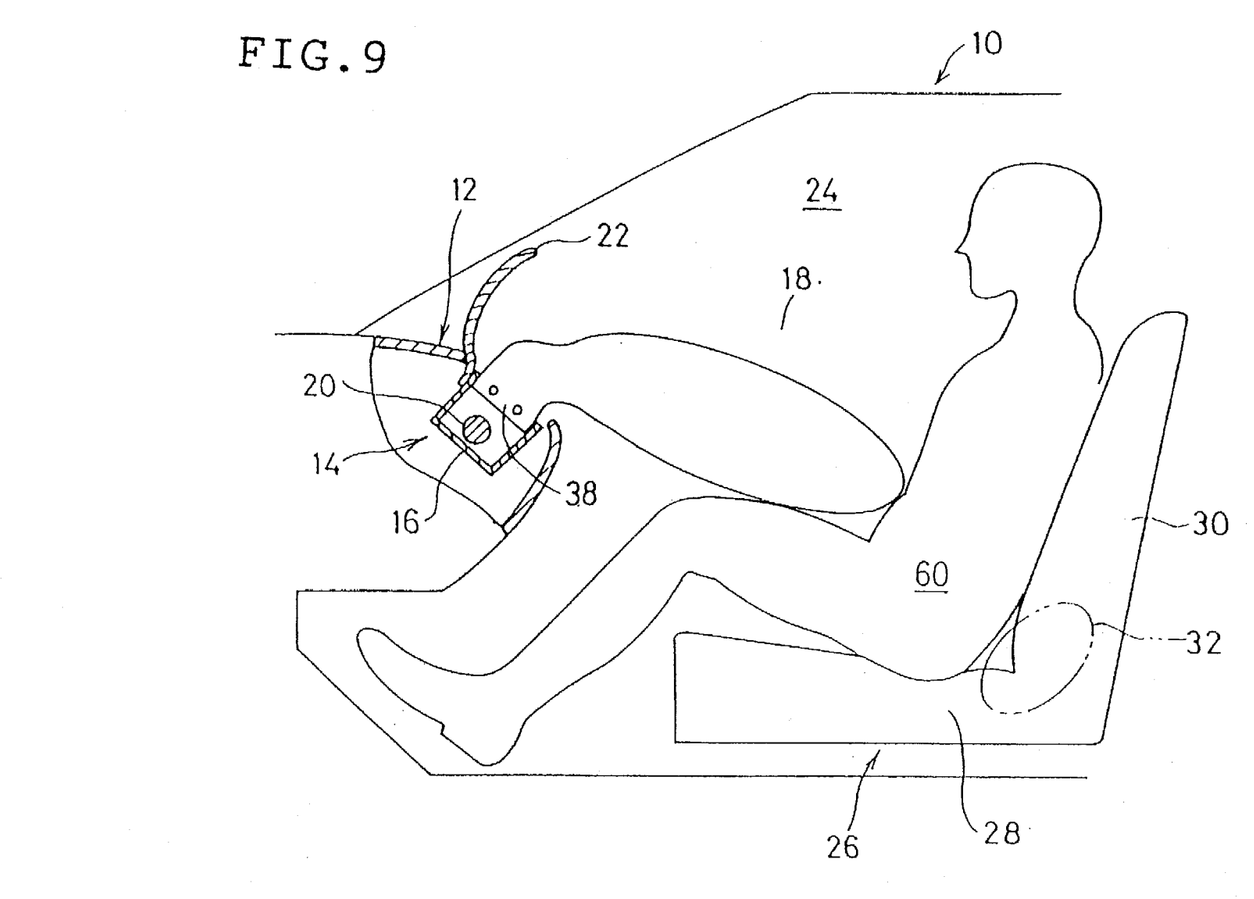
FIG. 9 is a side view of the inside of the vehicle mounted with the air bag device according to the embodiment.

As shown in FIG. 9, the air bag device 14 is mounted in an instrument panel 12 of the vehicle 10. The air bag device 14 has a casing 16, an air bag 18 folded and accommodated in the casing 16, an inflator 20 for generating gas for deploying the air bag 18, and a lid 22 covering the casing 16. The lid 22 has one side connected to the casing 16 to allow the lid to rotate toward the cabin 24 of the vehicle. The other side of the lid 22 opposite to the one side is connected to the casing 16 such that it becomes apart from the casing 16 upon pushing force of the air bag 18 when the inflator 20 operates to deploy the air bag 18.

The air bag 18 is formed in an envelope shape by sewing up two sheets of cloth which are a lower panel 34 at the lower side thereof and an upper panel 36 at the upper side thereof, as shown in FIGS. 1–6. The air bag 18 is structured to extend toward the portion about the corner 32 where a seat cushion 28 and a seat back 30 of a seat 26 in the vehicle 10 cross with each other.

The air bag 18 has an opening 38 for introducing gas from the inflator 20 at its rear portion. Flaps 42, 44, 46 and 48 are disposed on the periphery of the opening 38 and are connected to the casing 16. A vent hole 40 may be disposed in the lower panel 34.

The panels 34 and 36 are formed in a shape extending longer in the longitudinal direction than the width direction of the vehicle 10. The opening 38 in the air bag 18 is positioned near the front of the vehicle.

The first flap 42 is integral with the lower panel 34. The second, third and fourth flaps 44, 46 and 48 are integral with the upper panel 36.

The flaps 42,44,46,48 are provided with a plurality of through holes (circular holes or slits may be employed) 50 for inserting bolts or rivets.

Figure 1:
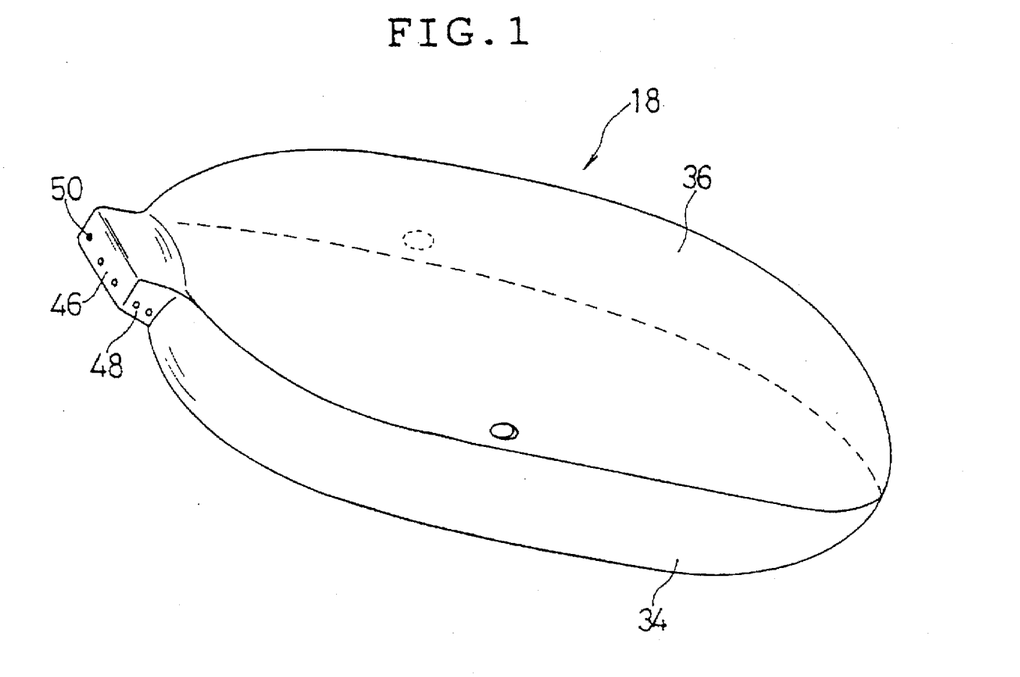
FIG. 1 is a perspective view of an air bag according to an embodiment of the present invention.
Figure 2:
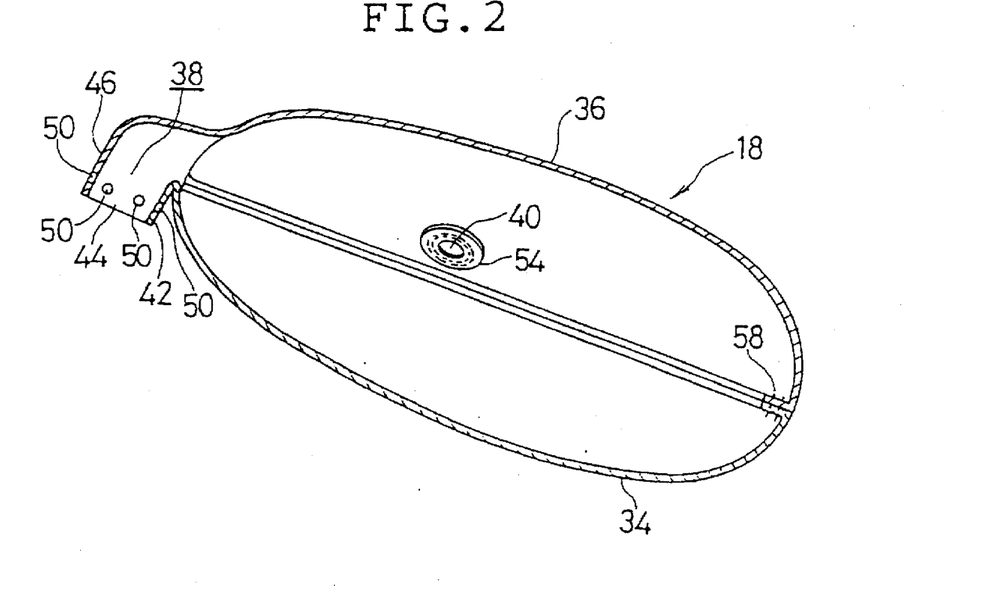
FIG. 2 is a section view of the air bag according to the embodiment.
Figure 3:
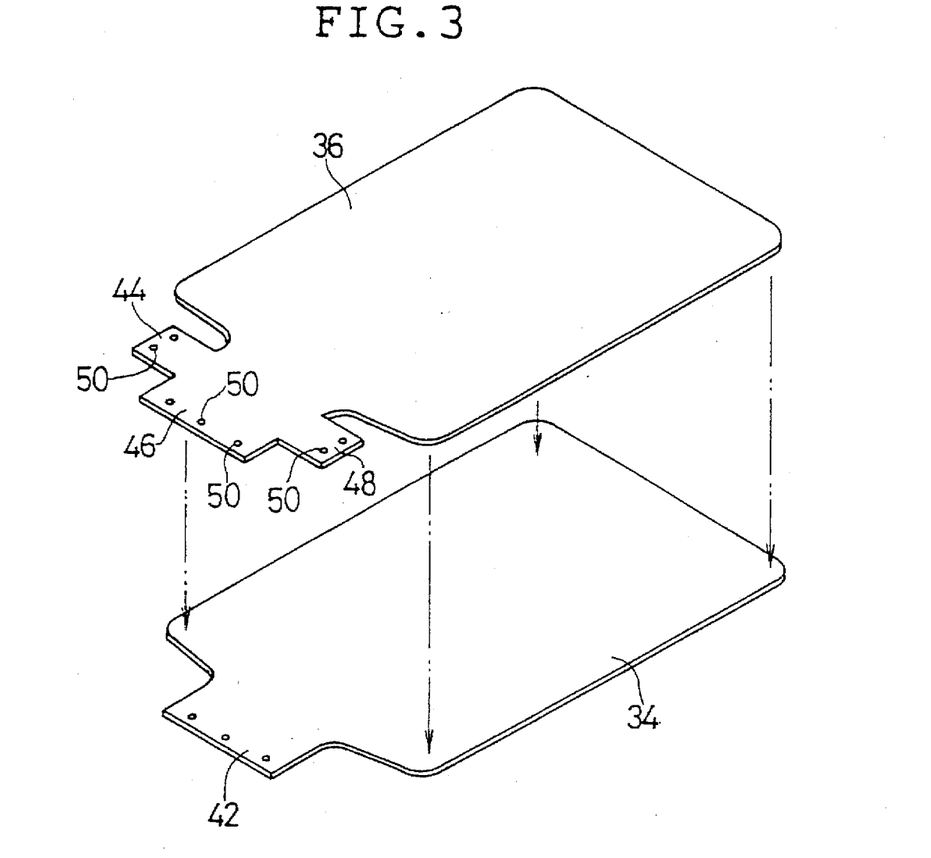
FIG. 3 is an exploded perspective view of the air bag according to the embodiment.
Figure 4:
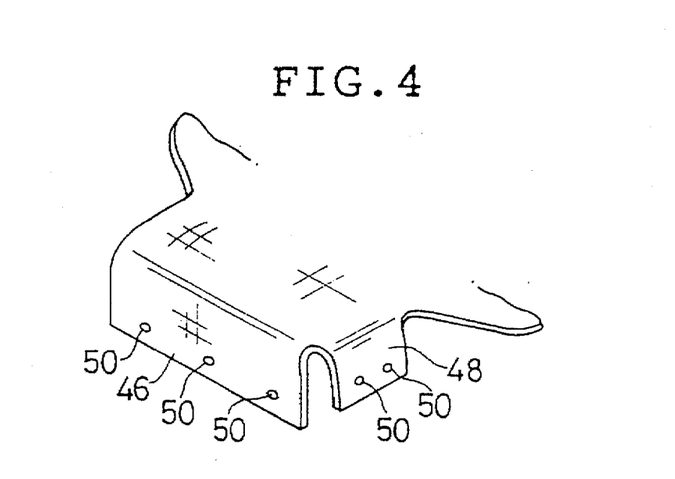
FIG. 4 is a perspective view of a part of the air bag according to the embodiment.
Figure 5:
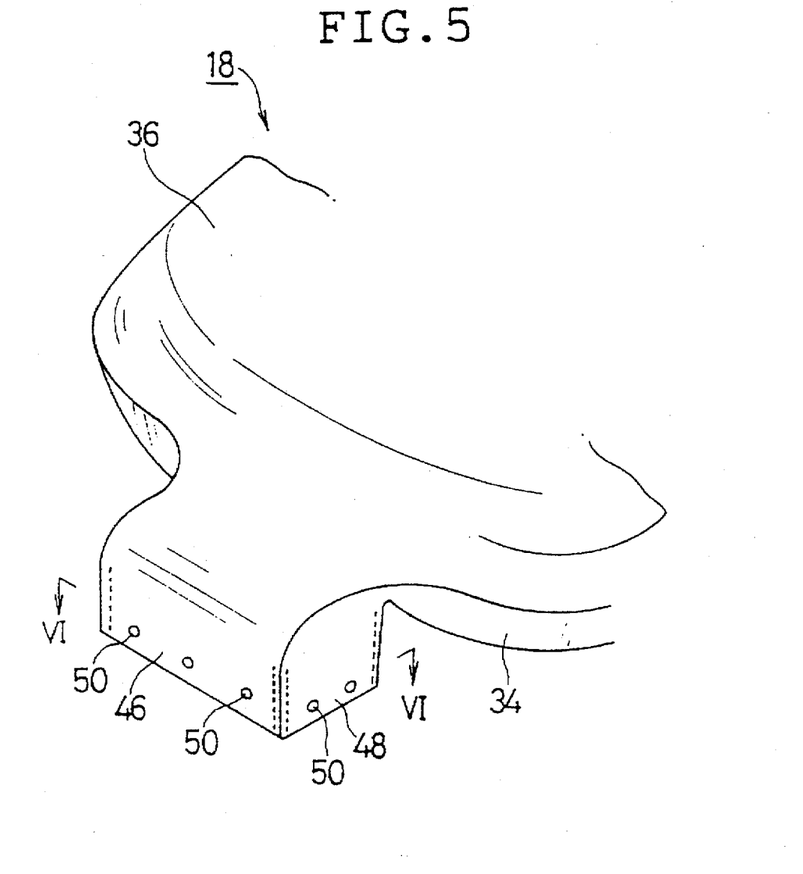
FIG. 5 is a perspective view of a part of the air bag according to the embodiment.
Figure 6:
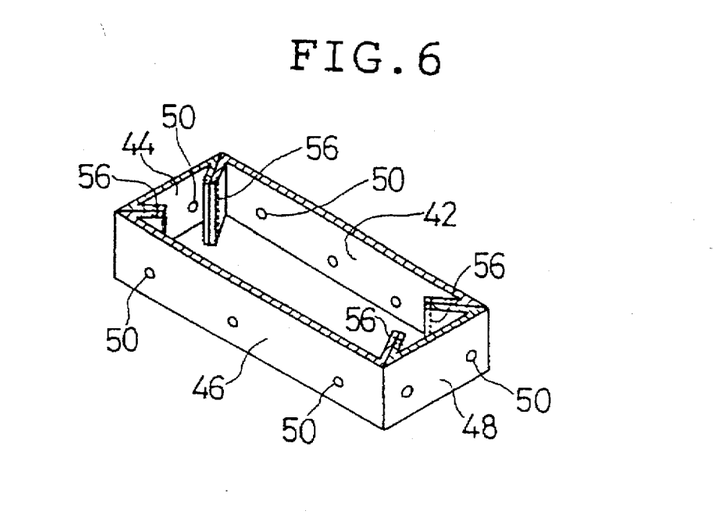
FIG. 6 is a perspective section view taken along VI—VI line in the FIG. 5.

Each vent hole 40 is provided with a ring-shaped patching cloth 54 sewed on the periphery thereof. The panels 34 and 36 are, as shown in FIG. 3, superposed each other on a work bench (not shown) of a sewing machine. The peripheral portions of the panels 34 and 36 are, as shown in FIG. 2, sewed up securely with a thread 58.

It is quite easy to sew them up because the two panels 34 and 36 are sewed in a state that the panels 34 and 36 are superposed on the flat work bench as mentioned above.

The panels 34 and 36 are preferably structured such that the textures of the panels cross with each other obliquely.

When the vehicle mounted with the air bag device 14 as structured above comes into collision, the inflator 20 spouts out gas to deploy the air bag 18. The lid 22 is pushed by the air bag 18 deploying and opens toward the cabin 24 of the vehicle. The air bag 18 then extends into the cabin 24 of the vehicle, as shown in FIG. 7. The air bag 18 extends toward the portion about the corner 32 where the seat cushion 28 and the seat back 30 cross with each other, as shown in FIG. 8. The air bag 18 finally touches the waist 60 of the occupant to restrain the waist 60 of the occupant.

As a result of various kinds of experiments, it is proved that the air bag 18 restraining the waist 60 can protect enough the occupant as well as a conventional air bag deployed widely in front of the upper part of the occupant, such as a part from the chest to the head, of the occupant. The air bag device 14 has an effect of restricting a forward movement of the lower part of the occupant without a seat belt when the vehicle comes into collision.

The air bag 18 of the air bag device 14 has a small volume as compared with a conventional air bag which deploys widely in front of the upper part of the occupant. Therefore, the air bag 18 is completely deployed in a short time. Furthermore, it is possible to reduce the capacity of the inflator 20.

Figure 12:
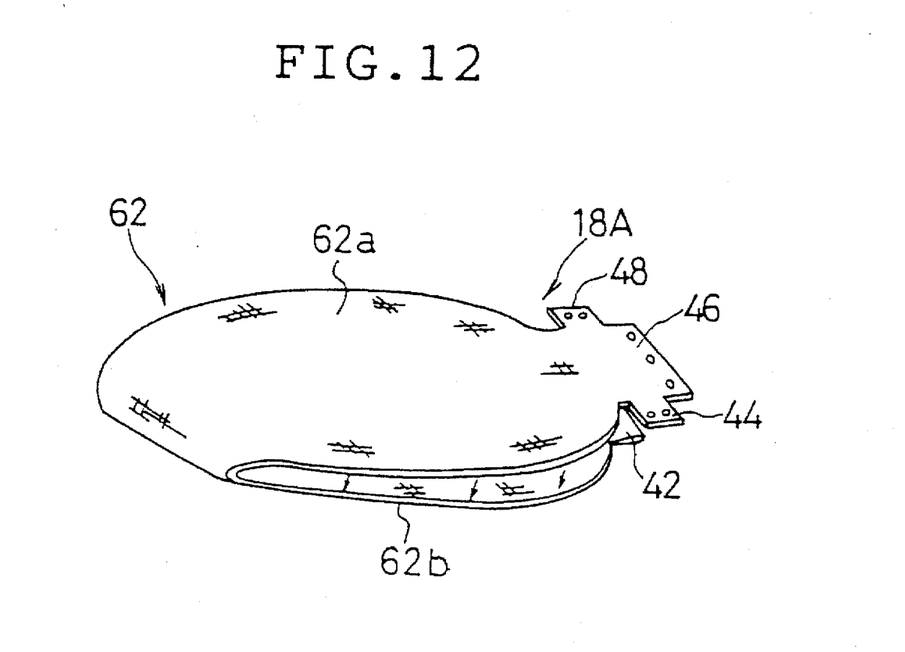
FIG. 12 is an exploded perspective view of an air bag 18A according to an embodiment.

The air bag 18 made by sewing up two panels 34 and 36 is employed in the above embodiment, but the invention is not limited thereto. An air bag according to the present invention may be an air bag such as an air bag 18A shown in FIG. 12 which is structured by folding one sheet of panel 62 in two and sewing up the peripheral portions of an upper panel 62a and a lower panel 62b.

Figure 10:
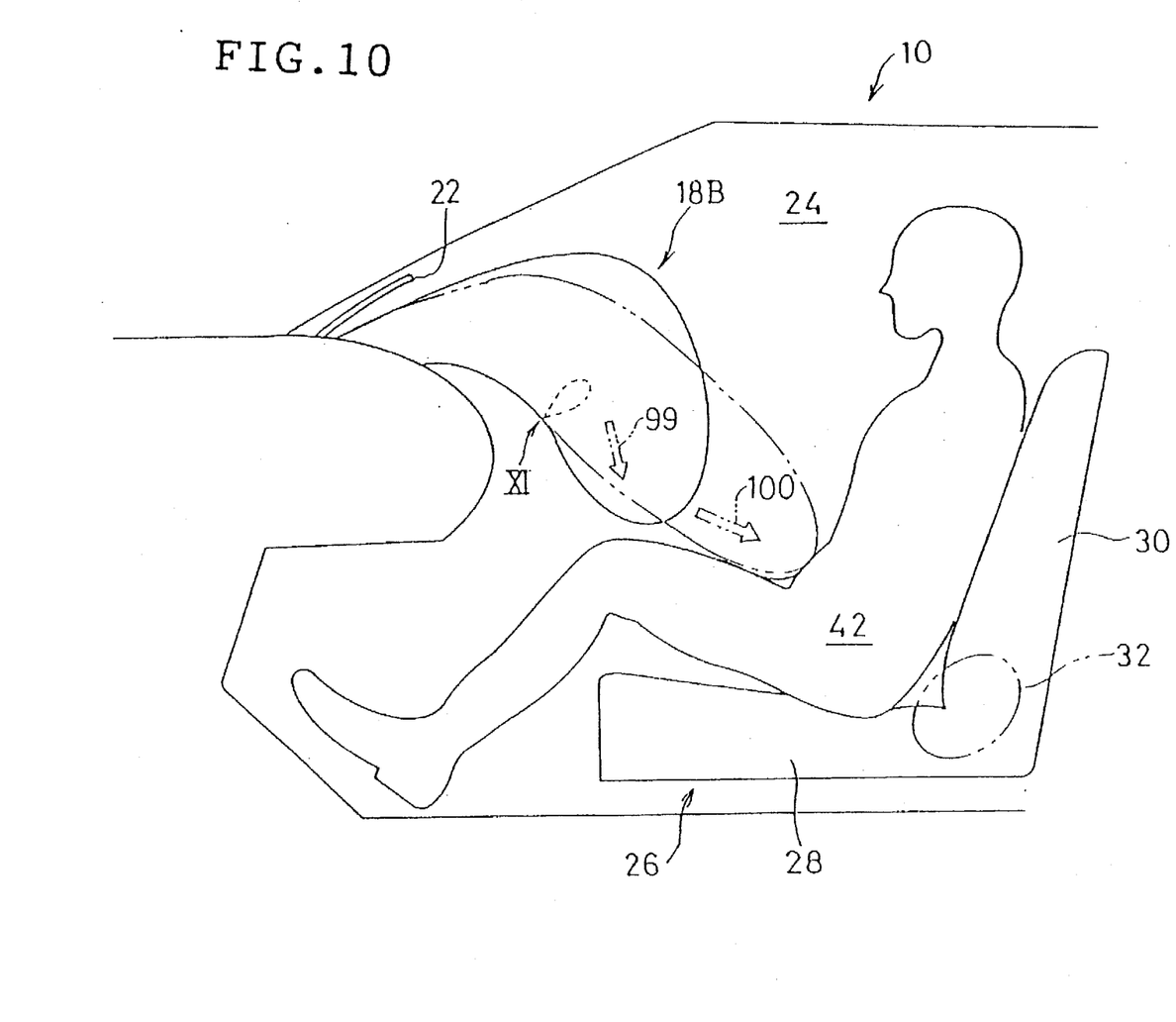
FIG. 10 is a side view of the inside of a vehicle mounted with an air bag device according to another embodiment.
Figure 11:
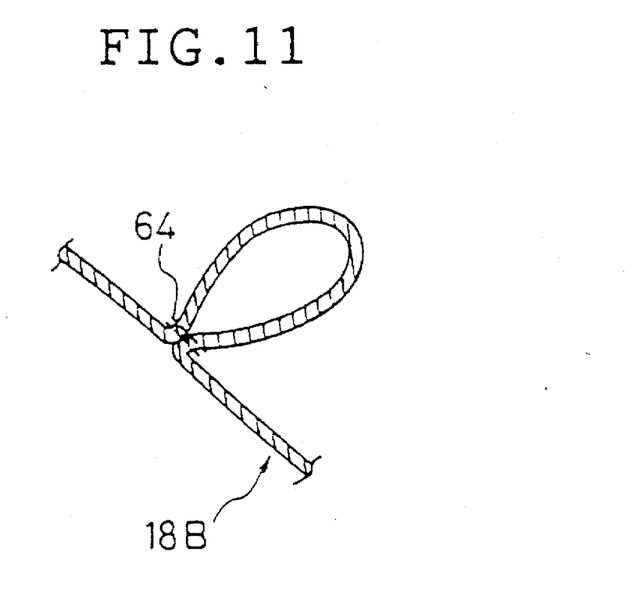
FIG. 11 is an enlarged section view of a portion XI in FIG. 10.

FIG. 10 is a side view of the inside of a vehicle mounted with an air bag device according to another embodiment of the present invention and FIG. 11 is an enlarged section view of a portion XI in FIG. 10.

In the air bag 18B used for this embodiment, one part of the lower side surface is lapped and sewed up with a thread 64. The thread 64 has characteristics to snap when a tensile force applied to the thread 64 exceeds a predetermined value due to an inner pressure of the air bag 18B exceeding a predetermined value.

In the air bag device as structured above, the air bag 18B is deployed by an operation of the inflator. The thread 64 does not snap until the air bag 18B becomes an intermediate deployed state as shown in FIG. 11. After the intermediate deployed state, the inner pressure in the air bag 18B is increased so that the tensile force applied to the thread 64 exceeds the strength of the thread 64, so that the thread 64 snaps. The tip portion of the air bag 18B extends toward the seat cushion 28 first as shown by the arrow 99 and, by a snap of the thread 64, the air bag then extends toward the portion about the corner 32 where the seat cushion 28 and the seat back 30 cross with each other, as shown by the arrow 100.

The air bag according to the present invention is suitable for a top-mount-type air bag device.

The top-mount-type air bag device is mounted in the upper part of the instrument panel.

The air bag device is mounted on the instrument panel 12 in the above mentioned embodiments, but the air bag device may be mounted also on the seat back 30 for protecting an occupant in a rear seat.

The panels are made of cloth in the above mentioned embodiments, but the panels may be instead made of a synthetic resin sheet.

The upper panel and the lower panel are connected by sewing up, but these panels may be connected also by adhesion or heat sealing.

As mentioned above, according to the present invention, an air bag can be made easily and the production cost of an air bag for a passenger seat or an air bag for a rear seat can be remarkably reduced.

The specification refers to the disclosure of application Ser. No. 322,515 filed on Oct. 14, 1994.

What is claimed is:

1. An air bag for an air bag device for a passenger seat, comprising:

an upper panel and a lower panel superposed together and connected along outer peripheries thereof to form a main portion, said upper and lower panels extending in a longitudinal direction when the air bag is inflated and having a side portion at one longitudinal end extending laterally outwardly from the main portion along the longitudinal direction, said side portion including an upper part extending from the upper panel and having three flaps extending downwardly from the upper part, and said lower panel including one flap, and an opening adapted to introduce gas from an inflator and located at a side opposite to the upper part, said opening being formed in said side portion and oriented downwardly therefrom substantially perpendicularly to the longitudinal direction of the upper and lower panels, said three flaps of the upper panel and said one flap of the lower panel being connected together to form the opening in a rectangular shape.

2. An air bag according to claim 1, wherein said upper and lower panels have generally rectangular shapes to form the main portion in a rectangular form, and the upper part of the side portion is rectangular to form the side portion in a rectangular form, a width of the side portion being less than a width of the main portion.

3. An air bag according to claim 2, wherein said air bag is used for a rear seat passenger.

* * * * *